United States Patent [19]

Musser

[11] Patent Number: 5,461,566
[45] Date of Patent: Oct. 24, 1995

[54] METHOD FOR MINIMALIZING STRUCTURAL RESONANCE ON VEHICLE ACCELERATION DATA

[75] Inventor: Kevin E. Musser, Brighton, Mich.

[73] Assignee: Automotive Systems Laboratory, Inc., Farmington Hills, Mich.

[21] Appl. No.: 187,877

[22] Filed: Jan. 27, 1994

[51] Int. Cl.$^6$ .............................. G06F 7/70; B60Q 1/102
[52] U.S. Cl. .................. 364/424.05; 180/282; 280/735
[58] Field of Search .................. 371/68.1, 67.1, 371/68.3, 36; 364/424.05, 566, 578; 180/282, 271, 273; 307/10.1; 340/436, 669; 395/575; 324/162; 280/732, 753, 730 R, 734, 737, 735

[56] References Cited

U.S. PATENT DOCUMENTS

| | | |
|---|---|---|
| 3,781,824 | 12/1972 | Caiati et al. . |
| 4,706,231 | 11/1987 | Mueller et al. . |
| 4,994,972 | 2/1991 | Diller .................. 364/424.05 |
| 5,021,678 | 6/1991 | Diller .................. 340/436 |
| 5,109,341 | 4/1992 | Blackburn et al. .......... 364/424.05 |
| 5,145,208 | 9/1992 | Hoagland et al. . |
| 5,189,311 | 2/1993 | Moriyama et al. .......... 364/424.05 |
| 5,191,327 | 3/1993 | Talmadge et al. .......... 340/870.38 |
| 5,194,755 | 3/1993 | Rhee et al. .............. 340/436 |
| 5,216,607 | 6/1993 | Diller et al. ............ 364/424.05 |
| 5,232,243 | 8/1993 | Blackburn et al. . |
| 5,282,134 | 1/1994 | Gioutsos et al. .......... 304/424.05 |
| 5,320,382 | 6/1994 | Goldstein et al. ......... 280/735 |
| 5,337,238 | 8/1994 | Gioutsos et al. .......... 364/424.05 |
| 5,337,260 | 8/1994 | Spangler ................. 364/571.02 |
| 5,339,242 | 8/1994 | Reid et al. .............. 364/424.05 |
| 5,343,411 | 8/1994 | Olson .................... 364/566 |
| 5,344,184 | 9/1994 | Keeler et al. ............ 280/732 |
| 5,345,402 | 9/1994 | Gioutsos et al. .......... 364/424.05 |
| 5,363,303 | 11/1994 | Allen et al. ............. 364/424.05 |
| 5,396,424 | 3/1995 | Moriyama et al. ......... 364/424.05 |
| 5,400,487 | 3/1995 | Gioutsos et al. .......... 280/735 |

Primary Examiner—Robert W. Beausoliel, Jr.
Assistant Examiner—Albert Decady
Attorney, Agent, or Firm—Lyman R. Lyon

[57] ABSTRACT

A method and system for improving reliability of a vehicle crash discrimination system by minimalizing the effect of resonance inherently produced by structural elements of the vehicle includes using at least two accelerometers (18,20) mounted to different structural elements (22, 24) of the vehicle. The accelerometers are preferably mounted in close proximity to each other to produce similar acceleration data, but corrupted by dissimilar structural resonance. Signal analysis processing (36) is performed to extrapolate the common acceleration data to generate an output (38) substantially uncorrupted by structural resonance for use in the vehicle crash discrimination system. Detection of operability of the accelerometers (34) can also be performed to provide for switching to a backup mode filtering process (44) to insure operability of the discrimination system upon failure of one of the accelerometers.

12 Claims, 2 Drawing Sheets

METHOD FOR MINIMALIZING STRUCTURAL RESONANCE ON VEHICLE ACCELERATION DATA

BACKGROUND OF THE INVENTION

The present invention generally relates to vehicle crash discrimination systems, and more particularly to a method and system for reducing the effect of structural resonance on vehicle crash discrimination system performance.

Typically, vehicle crash discrimination systems function to identify the nature of a vehicle collision. In essence, a vehicle crash discrimination system attempts to discriminate between minor impacts and vehicle decelerations of a magnitude sufficient to warrant deployment of a passenger restraint device, such as an airbag. In the past, vehicle crash discrimination systems have utilized relatively small sets of actual vehicle crash waveform data stored within a resident memory. The actual crash waveform data is generated by crashing test vehicles and recording the appropriate data, with each waveform set representing a different type of crash scenario. Such crash discrimination systems operate by comparing the stored sets of crash waveforms with vehicle acceleration data.

However, either in a collision or during the operation of the vehicle, resonance generated by a vehicle's frame, body, and other structural elements can distort the measured acceleration data. The resonance generated by different makes and models of vehicles is primarily unique to each particular vehicle because of the inherently different vehicle structural elements. Thus, crash waveform data sets which accommodate structural resonance must be created for each vehicle make and model by crashing vehicles of the same make or model under different crash conditions (i.e., vehicle speed, crash location). Because known vehicle crash discrimination systems have failed to recognize and reduce the resonant component present in the measured acceleration data, it heretofore has been impossible to use a generic set of vehicle crash waveforms in the crash discrimination system of a vehicle irrespective of the vehicle make and model.

Further, because crash waveforms have heretofore been produced by actually crashing vehicles, only small sets of crash waveform data were generated due to the high cost of crash vehicles. The small sets of crash waveform data have been generally used to represent all possible crash situations in the development and calibration of a crash discrimination system for a particular vehicle make or model. However, small finite sets of crash waveforms do not provide a reliable or realistic representation of all crash scenarios which can occur in real world situations.

Thus, known crash discrimination systems which have been designed or calibrated to use unique finite sets of crash waveforms are inherently limited with respect to reliability over the entire range of possible crash scenarios, have required expensive testing and calibration procedures to develop the unique set of crash waveforms, and have not been portable between vehicle makes and models.

SUMMARY OF THE INVENTION

Therefore, an object of the present invention is to provide a method and system for minimalizing the effect of resonance on vehicle acceleration data generated by a sensor mechanism to allow a generic set of vehicle crash waveform data to be utilized by any vehicle crash discrimination system.

Another object of the present invention is to provide a method and system which improves reliability of a vehicle crash discrimination system by minimizing the corruption on detected acceleration data caused by resonance inherently generated by the vehicle structural member to which a sensor is mounted.

A further object of the present invention is to provide a method and system which processes acceleration data to eliminate any requirement for a crash discrimination system to be customized for each different vehicle make or model.

Yet another object of the present invention is to provide a method and system for reducing the structural resonance in a vehicle's detected acceleration data, wherein the method and system provides for redundancy/backup to allow the crash discrimination system to operate notwithstanding failure of an acceleration-sensing component thereof.

In accordance with the present invention, a method for improving reliability of a vehicle crash discrimination system by minimizing the effects of structural resonance comprises the steps of receiving data representative of vehicle acceleration from a plurality of accelerometers which are each respectively mounted to a different structural element of the vehicle, wherein each accelerometer produces an output which is subject to different resonance inherently produced by the different structural members, performing signal analysis of the plurality of outputs to substantially remove the resonance from the vehicle acceleration data, and generating a processed output based on the signal analysis for use by the vehicle crash discrimination system. The step of performing a signal analysis comprises either comparing the plurality of outputs to each other to extrapolate the common acceleration data, averaging the plurality of outputs together, or correlating the plurality of outputs together. The plurality of accelerometers are preferably mounted in close proximity to each other.

Also in accordance with the present invention, a system for minimalizing resonance from a vehicle crash waveform comprises a plurality of accelerometers, each mounted to a different structural element of the vehicle, wherein each of the plurality of accelerometers generates an output which is subject to different resonance inherently produced by the different structural members, a signal analysis means for processing the plurality of accelerometer outputs to substantially remove the resonance from the vehicle acceleration data, and a means for generating a processed output based on the vehicle acceleration data after removal of resonance for use in a vehicle crash discrimination system. The signal analysis means comprises either means for comparing the plurality of accelerometer outputs to each other to extrapolate the common acceleration data, a means for averaging the plurality of outputs together, or a means for correlating the plurality of outputs.

In further accordance with the present invention, both the method and system can provide for determining if all of the plurality of accelerometers are functioning properly, and performing signal analysis on only the output of the functioning accelerometers.

The present invention will be more fully understood from the following Detailed Description of the Preferred Embodiment in conjunction with the accompanying drawings.

DETAILED DESCRIPTION OF THE PREFERRED EMBODIMENT

Figure 1:
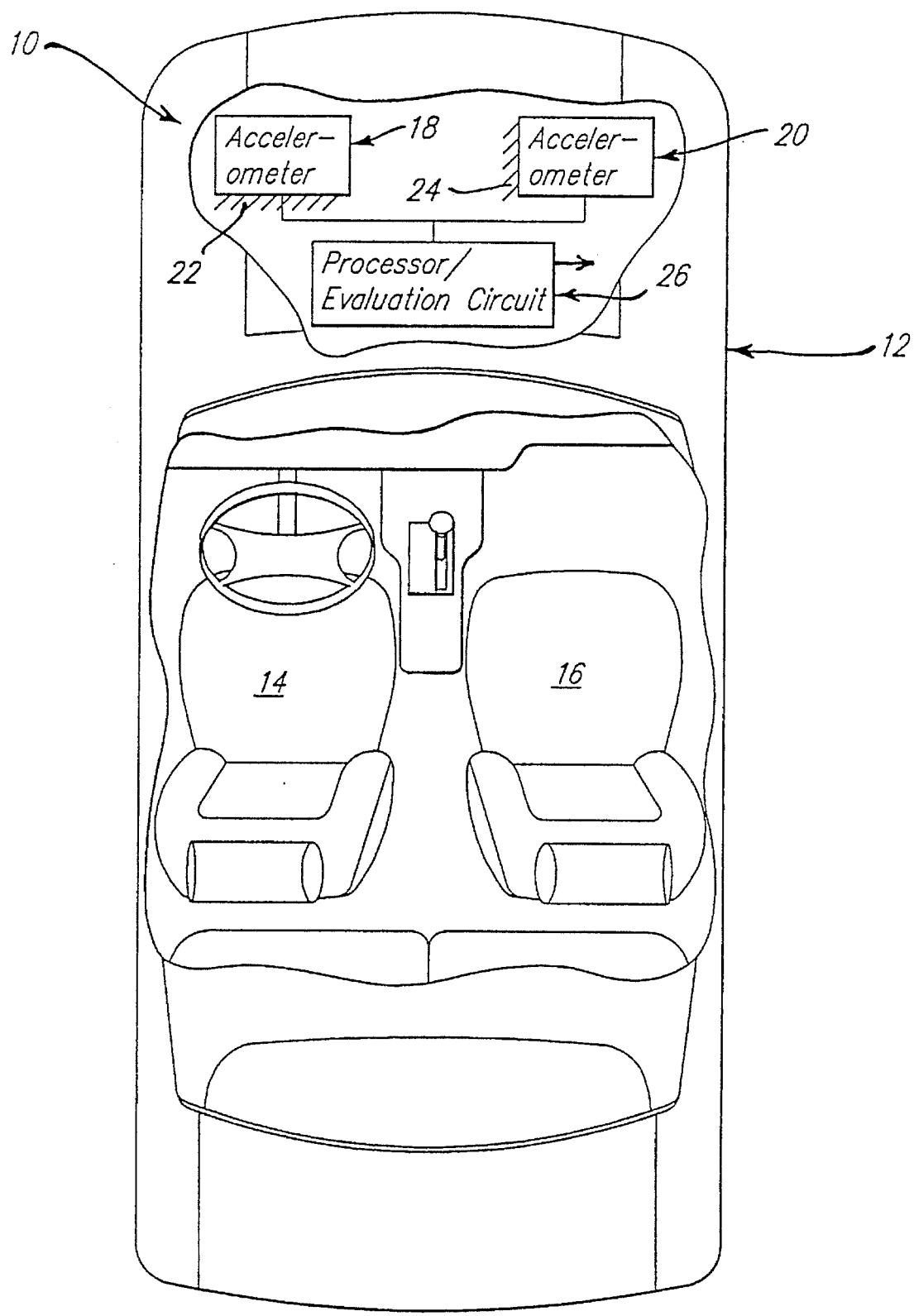
FIG. 1 is a diagram illustrating a system for minimalizing the effect of structural resonance on vehicle crash data utilized in a vehicle crash discrimination system.

Referring to FIG. 1, a system 10 for minimalizing the effect of structural noise on measured acceleration signals by substantially removing structural resonance from vehicle acceleration data is shown in conjunction with a motor vehicle 12 having front seats 14 and 16. The system comprises at least two accelerometers 18 and 20 located forwardly of the front seats 14 and 16 of the vehicle 12. One of ordinary skill in the art will appreciate that the accelerometers can be implemented in any known manner so that the accelerometers 18 and 20 provide an analog or digital output signal representative of the acceleration profile of the vehicle 12. The accelerometer 18 is mounted to, for example, a first structural component 22 of the vehicle 12, while the accelerometer 20 will be preferably attached to a different structural component 24 of vehicle 12. For example, accelerometer 18 could be mounted with a primary crash discrimination module, while the accelerometer 20 could be mounted to a different structure, but preferably in close proximity to the primary module. The accelerometers 18 and 20 generate outputs indicative of the same vehicle acceleration data or information, but are potentially corrupted by different additive noise due to different structural resonance inherently generated by components 22 and 24.

In further accordance with the present invention, the two accelerometer outputs are fed into a processor/evaluation circuit 26, such as a suitably programmed microprocessor, to perform a signal analysis of the received outputs to extrapolate the common vehicle acceleration data in the presence of the additive noise from the structural resonance. For example, the signal analysis method can involve the division of one accelerometer output into another accelerometer's output in accordance with the following logic:

accelerometer 18 output=X;
accelerometer 20 output=Y;

(a) if $x \div y \approx 1$, then either x or y can be used to determine the vehicle acceleration data;
(b) if $x \div y > 1$, then use y to determine vehicle acceleration data; and
(c) if $x \div y < 1$, then use x to determine vehicle acceleration data.

While the above described signal analysis method is illustrative of one technique which can be used to extrapolate the acceleration data in the presence of structural resonance noise, one of ordinary skill will appreciate that this method is not to be construed as limiting and that other methods involving mathematical/signal correlation, autocorrelation and/or averaging can be employed.

In accordance with a further aspect of the present invention, the system 10 will continue to provide a reliable data output even if one of the two accelerometers 18 or 20 fails to operate correctly. After detection of an accelerometer malfunction, the system 10 can simply pass through the output of the functioning accelerometer, or switch into a backup mode of operation involving the use of a backup resonance reduction algorithm. More specifically, the backup mode algorithm could be tailored to specifically approximate and reduce the resonant noise generated by the specific structure to which the properly functioning accelerometer is mounted. Therefore, the backup mode of operation ensures that failure of one accelerometer will not cause a complete system failure. In the backup mode, the processor 26 will produce an output signal indicative of the vehicle acceleration data output by the operating accelerometer, either with, or without the structural resonance reduced or filtered out.

Figure 2:
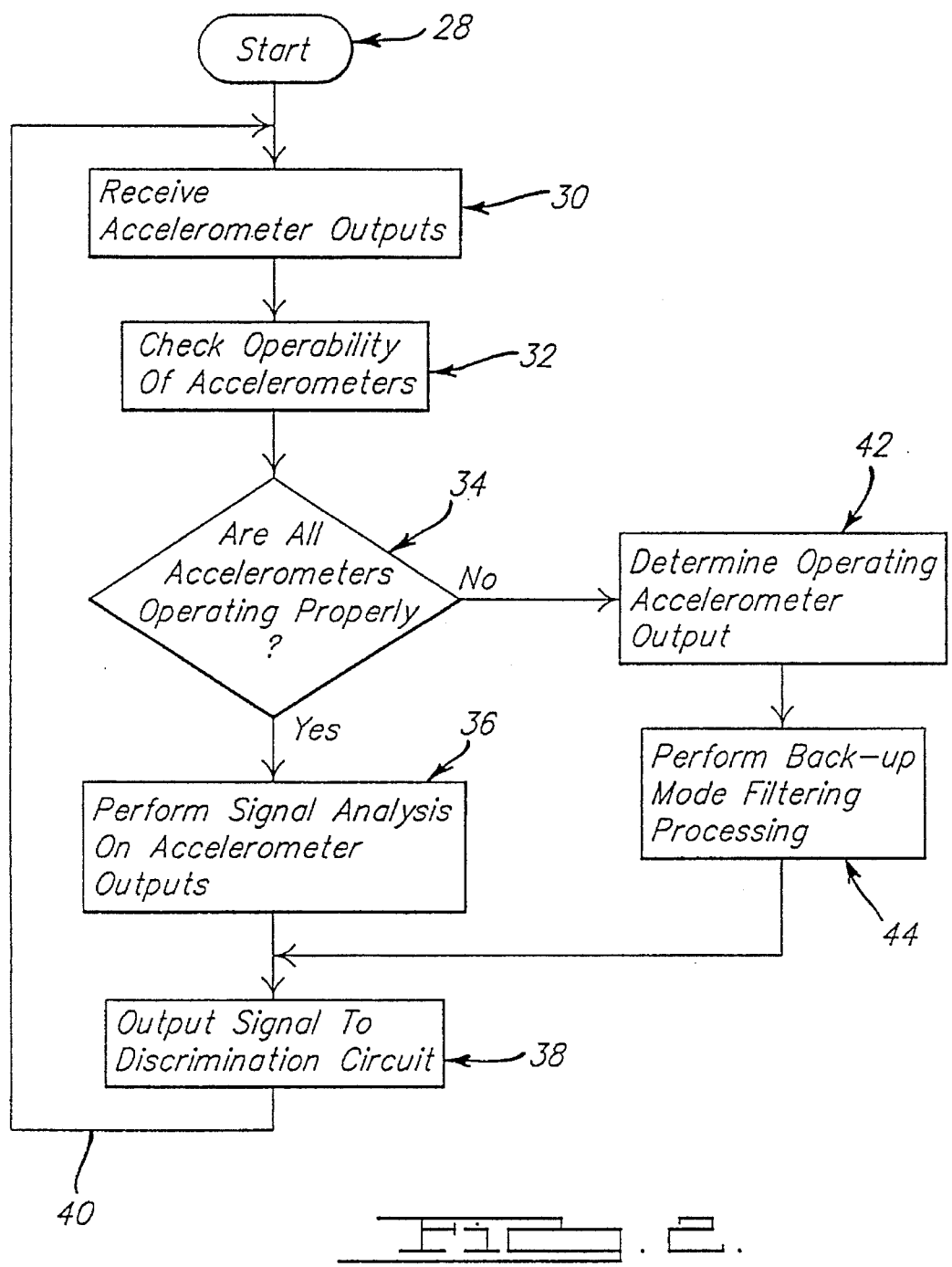
FIG. 2 is a flowchart showing system operation in accordance with the present invention.

Description of the overall method of reducing the effects of additive structural resonance in accordance with the present invention will be made in reference to the flow chart shown in FIG. 2. After the system 10 is initiated at step 28, the processor 26 receives the accelerometer outputs at step 30. Upon receipt of the outputs, the processor 26 analyzes the accelerometers outputs at step 32 to determine whether all of the accelerometers are operating properly. Operability testing can be implemented by any manner known to one having ordinary skill in the art, such as by comparing the accelerometer outputs to each other to verify similarities, or by transmitting an operability test signal to the accelerometers to generate the outputs of step 30. However, such examples are not to be construed as limiting the manner in which operability can be determined.

If all of the accelerometers are operating properly, the processor 26 performs signal analysis on the outputs at step 36 to minimalize corruption on the outputs by reducing and/or substantially removing the effects of structural resonance on the vehicle crash waveform/acceleration data as detected by the accelerometers. The signal analysis step 36 generates a single acceleration data signal which is output to a crash discrimination circuit (not shown) at step 38. The system then begins the process over again with a new set of datum generated by the accelerometer.

However, as shown at step 34, the system of the present invention can switch over to a backup mode of operation as previously described hereinabove. More specifically, if one of the accelerometers has malfunctioned, the processor 36 determines which accelerometer is operating properly at step 42 and switches into the backup mode, or alternatively could simply pass the operating accelerometer output to the discrimination circuit at step 38. If switched into a backup mode of operation, the processor 26 will perform backup mode filtering on the operating accelerometer output at step 44 to reduce and/or substantially remove the resonance generated by the specific structure to which the properly functioning accelerometer is mounted from the accelerometer output. This filtered data is then output to the discrimination circuit at step 38.

Thus, the present invention provides a method and system for minimalizing the effect of structural resonance on vehicle acceleration data, wherein the acceleration is constantly measured and converted into a plurality of signals, each signal indicative of a common underlying vehicle acceleration profile combined with a different structural resonant component. The signals are then processed to create a single uncorrupted set of acceleration datum. The effect of the resonance on the acceleration data is substantially removed by signal averaging, signal correlation, or signal comparison. Once the resonant component is substantially removed, a relatively accurate depiction of the underlying acceleration data is achieved. Since the corruption due the vehicle structure is no longer a factor, generic sets of crash waveforms can be utilized by a vehicle's crash discrimination system to analyze the detected vehicle acceleration data.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A method for improving reliability of a vehicle crash discrimination system by minimalizing effects of resonance attributable to structural elements of the vehicle comprising the steps of:

receiving data representative of vehicle acceleration from a plurality of accelerometers each mounted to a different structural element of the vehicle, wherein each of said plurality of accelerometers generates an output which is potentially corrupted due to different resonance inherently produced by the different structural elements;

performing signal analysis responsive to all of said plurality of outputs to remove the resonance to allow detection of the vehicle accelerometer data present in the potentially corrupted outputs; and generating a single output signal based on said signal analysis for use by the vehicle crash discrimination system.

2. The method of claim 1 wherein said step of performing a signal analysis comprises comparing said plurality of outputs to each other to extrapolate common acceleration data.

3. The method of claim 1 wherein said step of performing a signal analysis comprises averaging said plurality of outputs together.

4. The method of claim 1 wherein said step of performing a signal analysis comprises correlating said plurality of outputs together.

5. The method of claim 1 wherein said plurality of accelerometers are mounted in close proximity to each other.

6. The method of claim 1 further comprising the steps of determining whether all of the plurality of accelerometers are properly operating; and performing signal analysis on only the outputs of the properly operating accelerometers.

7. A system for minimalizing effects of resonance attributable to structural elements of a vehicle on detected vehicle acceleration data comprising:

a plurality of accelerometers, each mounted to a different structural element of the vehicle, wherein each of said plurality of accelerometers generates an output which is potentially corrupted due to different resonance inherently produced by the different structural elements;

signal analysis means responsive to all of said plurality of accelerometer outputs for processing said output to remove the resonance to allow detection of the vehicle acceleration data in the potentially corrupted outputs; and means for generating a single output signal based on the detected vehicle acceleration data for use in a vehicle crash discrimination system.

8. The system of claim 7 wherein said signal analysis means comprises means for comparing said plurality of accelerometer outputs to each other to extrapolate common acceleration data.

9. The system of claim 7 wherein said signal analysis means comprises means for averaging said plurality of outputs together.

10. The system of claim 7 wherein said signal analysis means comprises means for correlating said plurality of outputs.

11. The system in claim 7 further comprising a means for determining if all of said plurality of accelerometers are functioning properly; and a means for performing signal analysis on only the output of the functioning accelerometers.

12. The system in claim 7 wherein said plurality of accelerometers are mounted in close proximity to each other.

* * * * *